US008228313B2

(12) United States Patent
Wu et al.

(10) Patent No.: US 8,228,313 B2
(45) Date of Patent: Jul. 24, 2012

(54) KEYPAD ASSEMBLY AND PORTABLE ELECTRONIC DEVICE USING SAME

(75) Inventors: Jiun-Ching Wu, Taipei County (TW); Chih-Pu Hsu, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 826 days.

(21) Appl. No.: 12/354,904

(22) Filed: Jan. 16, 2009

(65) Prior Publication Data

US 2010/0103111 A1 Apr. 29, 2010

(30) Foreign Application Priority Data

Oct. 27, 2008 (CN) .......................... 2008 1 0305236

(51) Int. Cl.
*G06F 3/045* (2006.01)

(52) U.S. Cl. ........................................ 345/174; 345/168

(58) Field of Classification Search ........................ None
See application file for complete search history.

(56) References Cited

U.S. PATENT DOCUMENTS

| | | | | |
|---|---|---|---|---|
| 7,006,077 | B1 * | 2/2006 | Uusimaki | 345/173 |
| 2008/0186284 | A1 * | 8/2008 | Chang et al. | 345/173 |
| 2009/0085889 | A1 * | 4/2009 | Hyeon | 345/174 |
| 2009/0107824 | A1 * | 4/2009 | Ou | 200/5 A |
| 2009/0109182 | A1 * | 4/2009 | Fyke et al. | 345/173 |
| 2009/0153469 | A1 * | 6/2009 | Wang et al. | 345/156 |
| 2009/0176542 | A1 * | 7/2009 | Matsuoka | 455/575.4 |
| 2009/0290358 | A1 * | 11/2009 | Nakamura | 362/311.01 |

* cited by examiner

*Primary Examiner* — Van Chow
(74) *Attorney, Agent, or Firm* — Altis Law Group, Inc.

(57) ABSTRACT

A keypad assembly includes a keypad cover, a printed circuit board and a sensing module. The sensing module is arranged between the keypad cover and the printed circuit board. The sensing module is used to sense touches of a user's finger on the keypad cover. A portable electronic device equipped with the keypad assembly is also described.

7 Claims, 4 Drawing Sheets

KEYPAD ASSEMBLY AND PORTABLE ELECTRONIC DEVICE USING SAME

BACKGROUND

1. Field of the invention

The present invention relates to keypad assemblies, and particularly, to a keypad assembly used in a portable electronic device.

2. Description of related art

Portable electronic devices (e.g., mobile phones and digital cameras) are becoming smaller and thinner.

Thus, a mini keypad assembly is needed to meet small and thin demands. However, the symbols/numbers printed on the keypad assembly may become too small to read.

Therefore, there is room for improvement within the art.

BRIEF DESCRIPTION OF THE DRAWINGS

Many aspects of a keypad assembly can be better understood with reference to the following drawings. These drawings are not necessarily drawn to scale, the emphasis instead being placed upon clearly illustrating the principles of the present keypad assembly. Moreover, in the drawings like reference numerals designate corresponding sections throughout a plurality of views.

DETAILED DESCRIPTION OF EXEMPLARY EMBODIMENT

Figure 1:
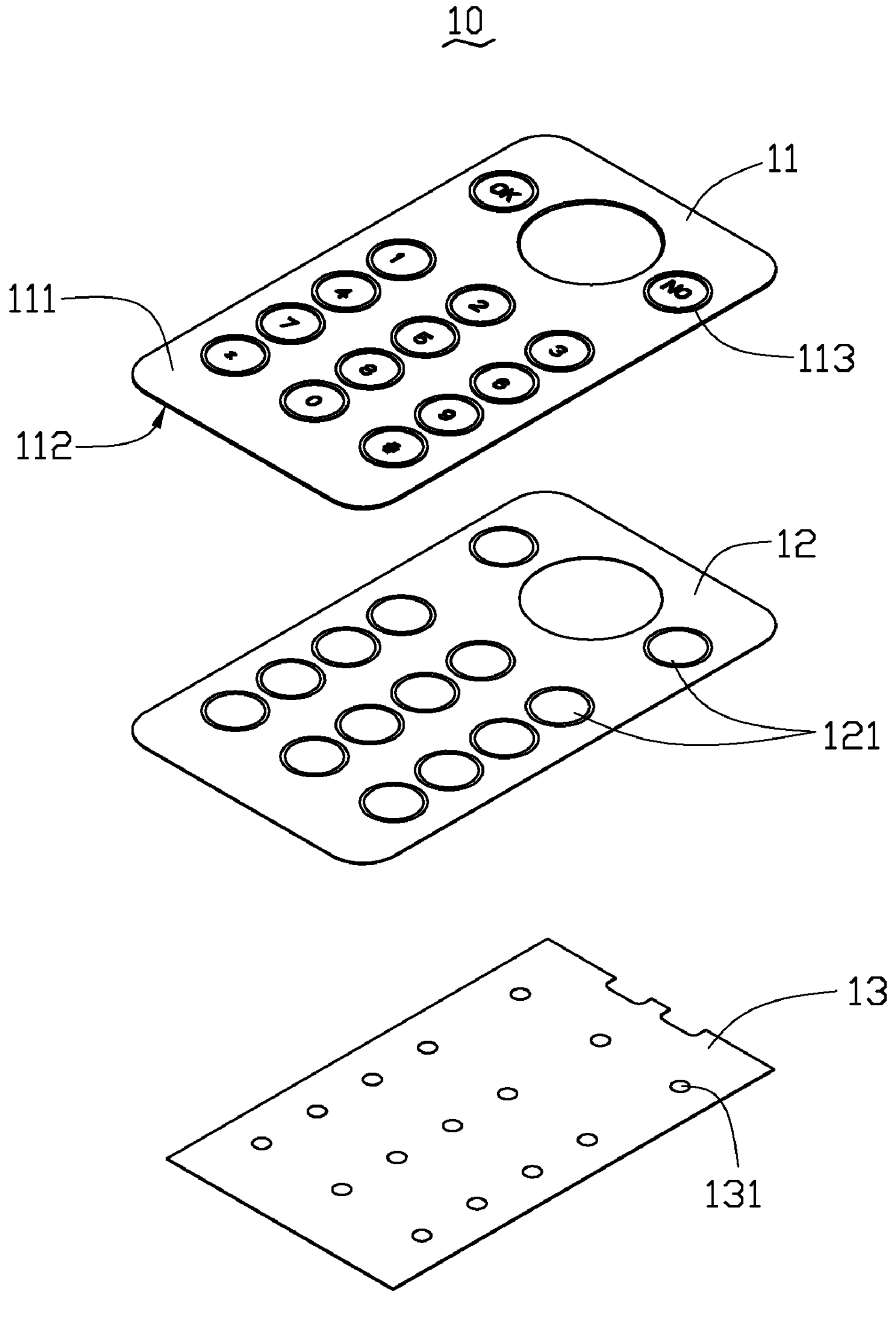
FIG. 1 is an isometric, exploded view of a keypad assembly, according to an exemplary embodiment.
Figure 2:
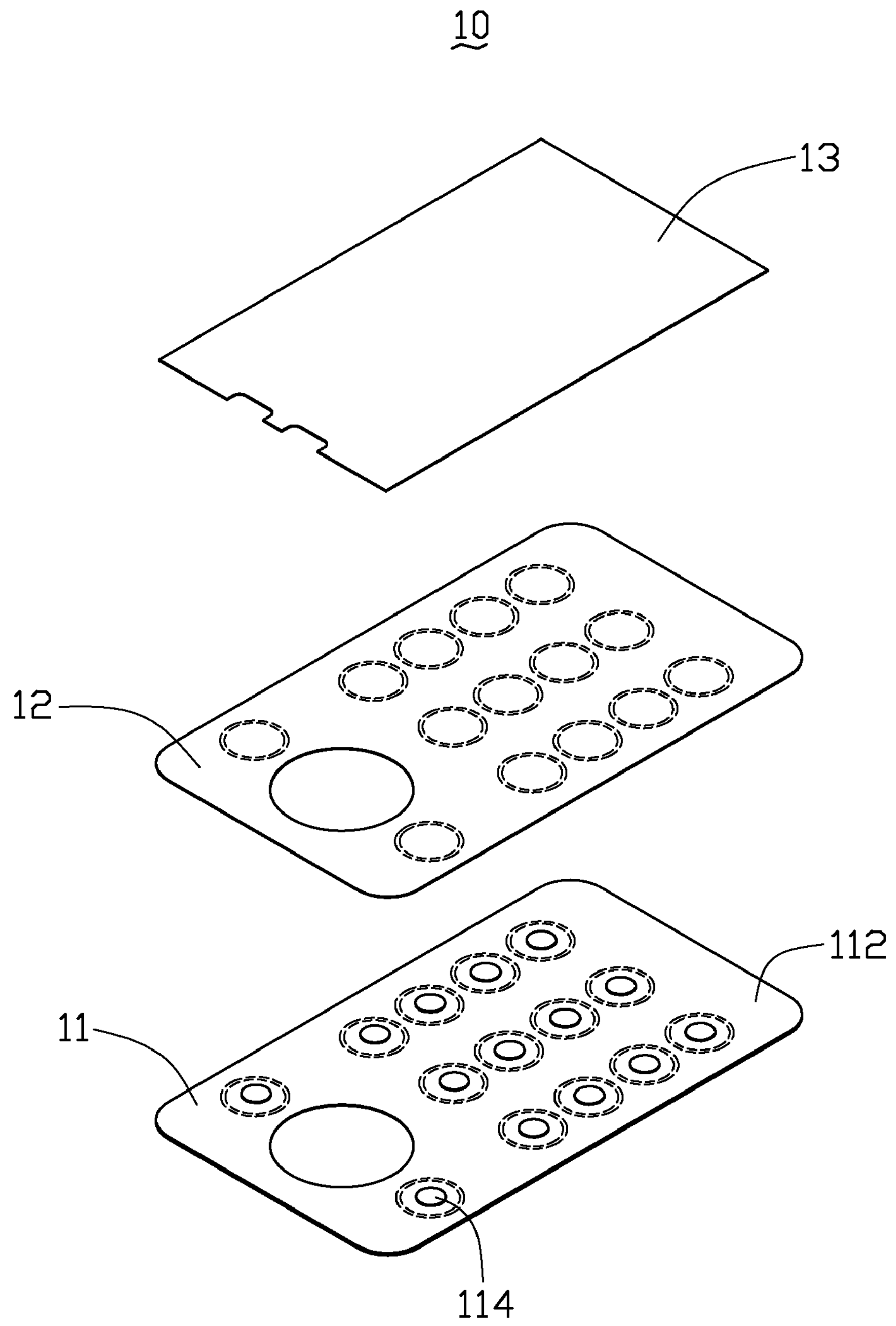
FIG. 2 is another isometric, exploded view of the keypad assembly shown in FIG. 1.
Figure 3:
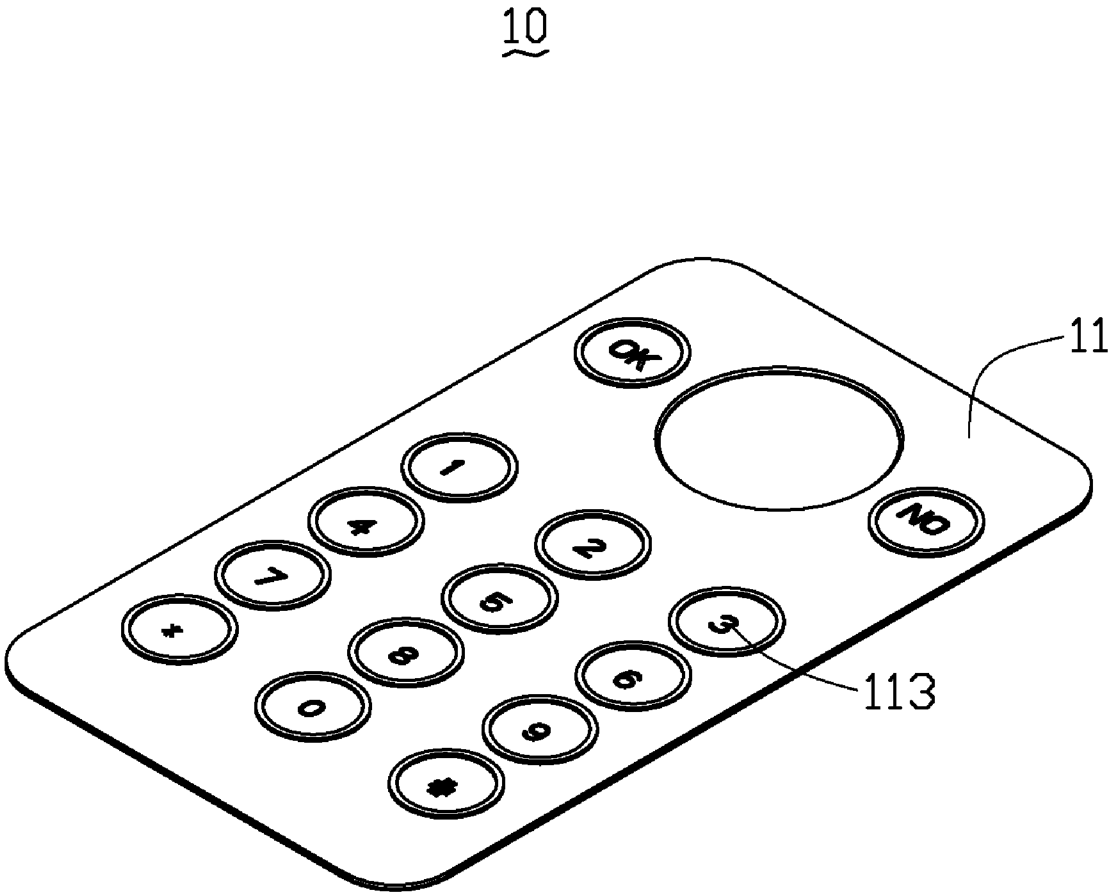
FIG. 3 is an isometric, assembled view of the keypad assembly shown in FIG. 1.
Figure 4:
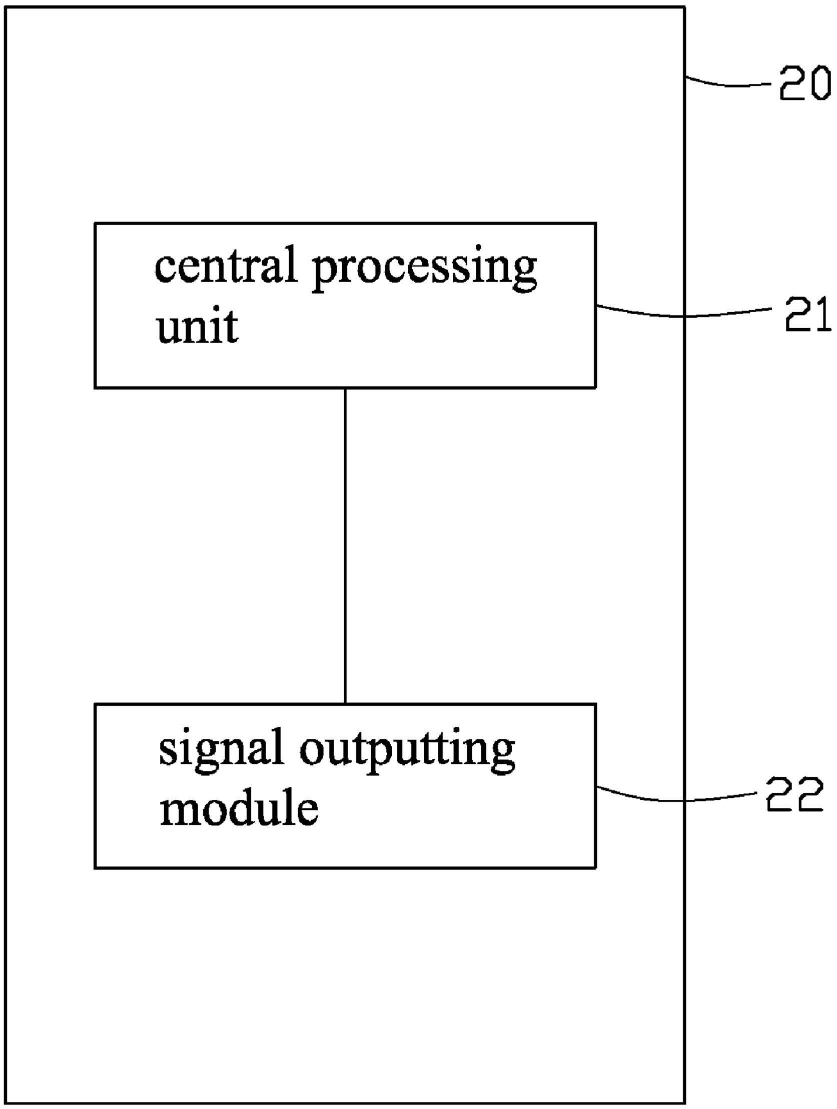
FIG. 4 is a schematic view showing a portable electronic device equipped with the keypad assembly shown in FIG. 1.

FIG. 1 shows an exemplary keypad assembly 10. The keypad assembly 10 is used in a portable electronic device 20 (schematically shown in FIG. 4), such as a mobile phone or a personal digital assistant (PDA). The portable electronic device 20 includes a central processing unit (CPU) 21 and a signal outputting module 22. The signal outputting module 22 is electronically connected to the CPU 21.

The keypad assembly 10 includes a keypad cover 11, a sensing module 12 and a printed circuit board (PCB) 13. The sensing module 12 and the PCB 13 are electrically connected to the CPU 21. The keypad cover 11, the sensing module 12 and the PCB 13 are aligned with and adhered to each other.

The keypad cover 11 may be made of an elastic material (e.g., rubber). The keypad cover 11 includes a top surface 111 and an opposite bottom surface 112. The top surface 111 defines a plurality of pressing portions 113. Keypad symbols/numerals (e.g., # or 1) are printed to the pressing portions 113. The bottom surface 112 forms a plurality of contact portions 14 corresponding to the pressing portions 13.

The sensing module 12 defines a plurality of touch-sensing portions 121 that can sense slight touches of a user's fingers on the pressing portions 113. When one of the pressing portions 113 is slightly touched but not completely pressed down, the corresponding sensing portion 121 is triggered to send an electronic signal to the CPU 21. When the touch is removed from the pressing portion 113, the sensing module 12 sends another electronic signal to the CPU 21 to cancel the previous electronic signal.

The PCB 13 forms a plurality of press-sensing portions 131 corresponding to the contact portions 114. Each press-sensing portion 131 is generally curved. When one of the pressing portions 113 is pressed down, the corresponding contact 114 abuts against the corresponding press-sensing portion 131. Then the press-sensing portion 131 is triggered to send a corresponding electronic signal to the CPU 21.

The CPU 21 receives the electronic signals sent from the sensing module 12 or the PCB 13, and transforms the electronic signals into outputting commands. The outputting commands are then transmitted to the signal outputting module 22. The signal outputting module 22 receives the outputting commands and export corresponding signals to a screen or an earphone.

In use, when a user's fingers move slightly between different pressing portions 113, the sensing modules 12 can sense the slight touches of user's fingers, and export or cancel the corresponding signals on the screen or the earphone in real-time. Thus, before a pressing portion 113 is pressed completely down, the user can identify which pressing portion 113 is being touched from the screen or the earphone by the sensing module 12. If the touched pressing portion 113 is the desired one, the user can then directly press it completely down. If the touched pressing portion 113 is not the desired one, the user can simply move his fingers to touch other pressing portions 113 until he finds the desired one and then press it completely down.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A keypad assembly mounted to a portable electronic device including a central processing unit and a signal outputting module electronically connected to the central processing unit, the keypad assembly comprising:

a keypad cover;

a printed circuit board; and a sensing module positioned between the keypad cover and the printed circuit board, the sensing module and the printed circuit board being electrically connected to the central processing unit, the sensing module sensing a slight touching on the keypad cover and triggered to send out corresponding electronic signals to the central processing unit, the central processing unit transforming received electronic signals to export commands and transmitting the export commands to the signal outputting module, the signal outputting module exporting signals corresponding to the outputting commands for identifications, the printed circuit board subjected to no triggering from the slight touching on the keypad cover; and the keypad cover further configured to be completely pressed down, triggering the printed circuit board to send corresponding electronic signals to the central processing unit after going through identifications.

2. The keypad assembly as claimed in claim 1, wherein the sensing module can send out another electronic signal to the central processing unit to cancel the previous electronic signal.

3. The keypad assembly as claimed in claim 2, wherein the printed circuit board arranges a plurality of press-sensing portions corresponding to the contact portions.

4. The keypad assembly as claimed in claim 1, wherein the keypad cover has a top surface and an opposite bottom surface, the top surface arranging a plurality of pressing portions, and the bottom surface arranging a plurality of contact portions corresponding to the pressing portions.

5. The keypad assembly as claimed in claim 4, wherein the sensing module arranges a plurality of touch-sensing portions corresponding to the contact portions, used to sense touches of a user's finger.

6. A portable electronic device, comprising:

a central processing unit;

a signal outputting module being electronically connected to the central processing unit;

a keypad assembly including a keypad cover, a printed circuit board, and a sensing module being arranged between the keypad cover and the printed circuit board, the sensing module and the printed circuit board being electronically connected to the central processing unit, the sensing module sensing a slight touching on the keypad cover and being triggered to send out corresponding electronic signals to the central processing unit, the central processing unit changing received electronic signals to export commands and transmitting the export commands to signal outputting module, the signal outputting module displaying signals corresponding to the outputting commands for identifications, the printed circuit board subjected to no triggering from the slight touching on the keypad cover; and the keypad cover further configured to be completely pressed down, triggering the printed circuit board to send corresponding electronic signals to the central processing unit after going through identifications.

7. The portable electronic device as claimed in claim 6, wherein the sensing module can send out another electronic signal to the central processing unit to cancel the previous electronic signal.

* * * * *